United States Patent Office 3,390,521
Patented July 2, 1968

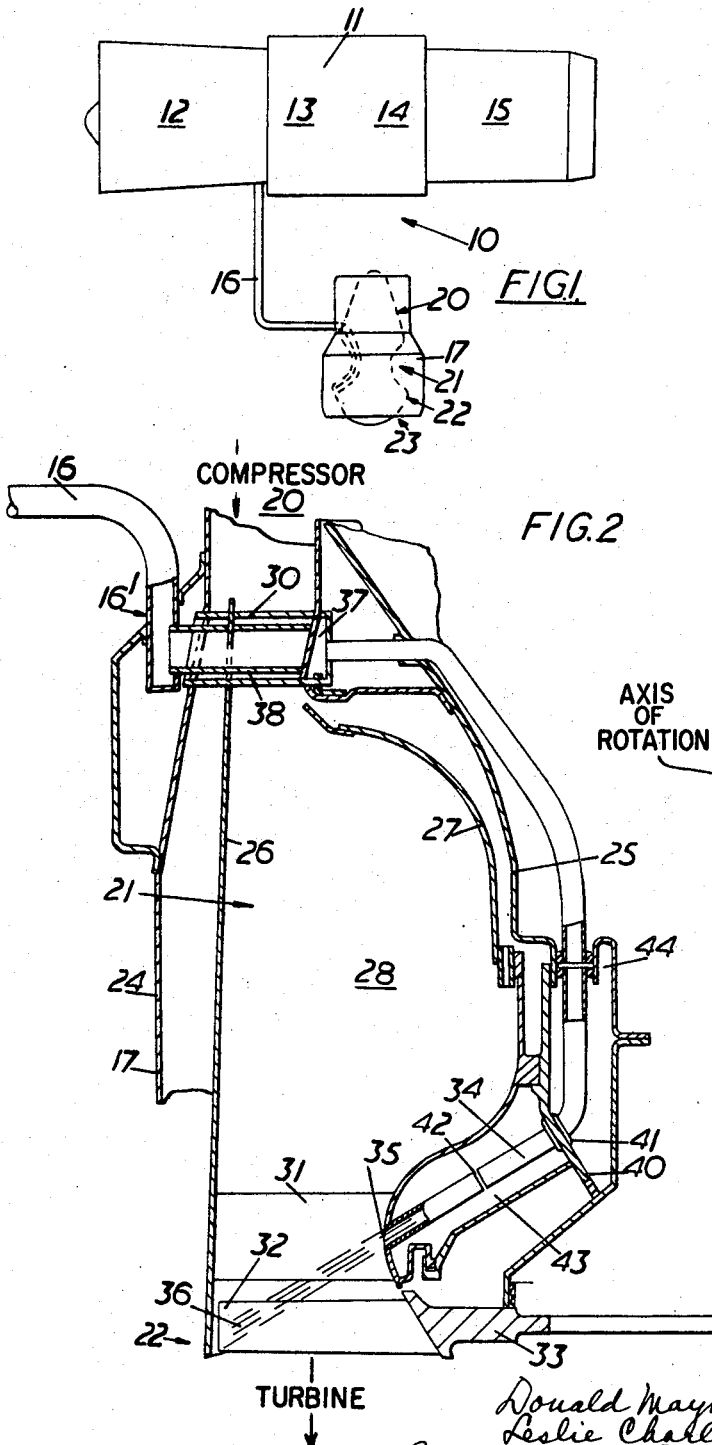

3,390,521
GAS TURBINE ENGINE
Donald Maynard Anley, Long Eaton, and Leslie Charlesworth, Allestree, Derby, England, assignors to Rolls-Royce Limited, Derby, Derbyshire, England, a British company
Filed July 18, 1966, Ser. No. 566,022
Claims priority, application Great Britain, Aug. 2, 1965, 33,024/65
2 Claims. (Cl. 60—39.14)

ABSTRACT OF THE DISCLOSURE

An engine starting arrangement for a gas turbine engine which has, in flow series, compressor means, outlet guide vanes, combustion equipment, nozzle guide vanes, and turbine means; and including a tube which is connected to a source of compressed air and which terminates adjacent the radially inner ends of the nozzle guide vanes. The tube directs air onto the turbine blades with a radially outward component of velocity to start the engine.

---

This invention concerns a gas turbine engine and, although not so restricted, it will hereinafter be described with reference to a direct lift engine, i.e., an engine adapted to provide lift independently of lift produced by the flow of air over aerodynamic surfaces.

According to the present invention, there is provided a gas turbine engine having a flow duct in which are mounted, in flow series, compressor means, compressor outlet guide vanes, combustion equipment, nozzle guide vanes and at least one row of turbine blades, said engine being provided with a tube which is adapted to be connected to a source of compressed air, said tube having an outlet end which terminates at the radially inner ends of the nozzle guide vanes of the turbine of said engine without protrusion into said flow duct and directing air with a radially outward component of velocity onto the row of turbine blades following said nozzle guide vanes to start the engine.

By directing the starting air radially outwardly of the engine, the air can be directed adjacent the radially outermost portion of the blades and therefore the largest turning moment can be impressed upon the blades to thereby facilitate rotation of the rotor.

Preferably said tube passes through the outlet guide vanes of the compressor means of the engine, and radially inwardly of the combustion equipment of the engine towards said nozzle guide vanes, the said source being disposed outside the engine casing.

By passing the tube through the outlet guide vanes from the compressor and thus to the exterior of the engine, the tube can pass through existing outlets and apertures provided in the engine casing adjacent the outlet guide vanes, and thus no additional apertures need be formed within the exterior casing of the engine. By keeping the number of apertures and holes in the casing to a minimum, the casing can be maintained light yet strong.

Preferably there is a part-annular manifold disposed at the radially inner ends of said outlet guide vanes, and communicating with said tube, a plurality of ducts passing through a plurality of outlet guide vanes leading air from said air source into said manifold.

By passing the air through a plurality of outlet guide vanes, and then through the single tube to the nozzle guide vanes of the turbine, each of the tubes carrying the air across the outlet guide vanes can be relatively small in cross-sectional dimension and thus the outlet guide vanes can be maintained at their normal slim size and no increase in thickness will be required.

Preferably, the tube is supported radially inwardly of its outlet end and is split between the outlet end and the support to accommodate thermal expansion therein, that portion of the tube between the support and the outlet end being disposed within a sealed chamber to prevent air escaping from the tube through the split.

In a preferred embodiment, the tube directs the air onto the rotor blades at the inlet angle thereto. It will be appreciated that the air may also be directed onto the blades of the rotor in a radial plane which extends axially of the engine, but the kinetic energy of the air will not be fully utilized in this way and directing the air onto the blades at their inlet angles will facilitate starting.

In its preferred form, the engine is a direct lift engine, the air for starting said engine being bled from the compressor of a forward propulsion engine with which the lift engine is adapted to be used.

According to another aspect of the present invention, there is provided a power plant comprising a direct lift engine as set forth above, and a forward propulsion engine, the compressor of which commmunicates with said tube to supply air thereto.

The invention is illustrated, merely by way of example, in the accompanying drawings, in which:

FIGURE 1 is a diagrammatic view of power plant including a gas turbine engine according to the present invention, and FIGURE 2 is a part-sectional elevation of part of the power plant of FIGURE 1, showing an engine in accordance with the present invention.

Referring to the drawings, there is shown power plant 10 comprising a gas turbine forward jet propulsion engine 11, comprising compressor 12, combustion equipment 13, turbine 14 and jet pipe 15. Communicating with compressor 12 is a bleed air duct 16, supplying air to a vertically disposed direct lift engine 17 to facilitate starting thereof.

Engine 17 comprises compressor 20, combustion equipment 21, turbine 22 and outlet nozzle 23. A part of the engine is shown in more detail in FIGURE 2.

Referring to FIGURE 2, the engine 17 is seen to include an external casing 24, and an internal casing 25 between which there is disposed an external flame tube wall 26 and an internal flame tube wall 27 defining therebetween a combustion chamber 28. Connected between the casing walls 24, 25 and disposed upstream of the combustion chamber 28 are a plurality of outlet guide vanes 30 from the compressor 20 which extend across the combustion air duct from the compressor 20 to the combustion chamber 28. Disposed at the downstream end of the walls 24, 25 and extending therebetween are a plurality of radially extending nozzle guide vanes 31 downstream of which there is disposed a plurality of rotor blades 32 of a turbine rotor 33.

Communicating with the flow passage between two adjacent nozzle guide vanes 31 is a tube 34, which has, in flow series, a radially inwardly directed first portion, a substantially axial second portion, and a radially outwardly directed third portion. An outlet 35 of the third portion is directed radially outwardly of the engine from the radially inner end of the nozzle guide vanes 31 such that said tube offers no obstruction to gas flow in the duct defined by the wall 26 and the continuation of wall 27. The air issuing from outlet end 35 is also given a component of velocity in a downstream direction to issue as indicated at 36 in FIGURE 2. The second portion of tube 34 passes radially inwardly of the inner wall 25 of the engine in a substantially axial direction, and communicates with a part-annular chamber 37 disposed at the radially inner ends of a number of the outlet guide vanes 30. Passing through each of said number of outlet guide vanes 30 and disposed between the air bleed tube 16 and the part-annular tube 37 are a number of air ducts 38, each constituting said first portion of the tube 34, one of which is disposed in each of said outlet guide vanes 30 which is disposed adjacent the part-annular chamber 37. In a typical embodiment, there may, for example, be four outlet guide vanes 30 provided with four of said tubes 38, the chamber 37 extending across the radially inner ends of said four outlet guide vanes. The tube 16 communicates with the radially outer ends of the ducts 38, e.g., the four ducts in the preferred embodiment indicated above, and may, for this purpose, be provided with a part-annular end 16', or may be divided into a number of individual pipes, each of which communicates with one of the ducts 38.

Radially inwardly of its outlet end 35, the tube 34 is supported from rigid structure 40, and with a seal 41. Between the seal 41 and the outlet end 35, the tube 34 is split into two parts separated by a gap, e.g., at 42, to permit thermal expansion of the outlet end of the tube relative to the remainder thereof. To reduce the leak of air from the tube 34 through the split 42, the portion of the tube 34 between the seal 41 and the outlet end 35 is disposed within a sealed chamber 43. The seal 41 is flexible to accommodate distortion of the tube 34 and the tube is also supported at 44 in a further resilient mounting to accommodate further distortion of the tube.

With the construction described above, it will be appreciated that, by directing the air radially outwardly, the air is caused to impinge on the turbine blades 32 adjacent the radially outermost sections of the blade and thus a greater turning moment is provided on the rotor, thus facilitating starting.

By passing the tube 34 to the exterior of the engine through the outlet guide vanes to the compressor, the apertures in the external casing 24 of the engine which are formed to fix the outlet guide vanes thereto, are utilized for the air ducts for the starting air, and thus no additional air ducts need be cut in the exterior wall of the engine.

Additionally, by disposing the tube 34 radially inwardly of the combustion equipment of the lift engine, instead of passing it along the exterior of the engine, and thus to the turbine 33, the overall dimensions of the lift engine can be reduced and waste space within the interior of the engine, i.e., radially inwardly of the combustion equipment, can be utilized.

It will be appreciated that the invention is not restricted to use with lift engines, but may, of course, be used in the starting equipment of a forward propulsion engine, e.g., the engine 11.

In the specific embodiment illustrated, the tube 34 is so orientated that the air issuing from the outlet 35 in the direction 36 impinges upon the rotor blades 32 at the inlet angle thereto. In this manner, the kinetic energy of the air is utilized in full. However, the air may be directed in a radial plane which extends axially of the engine, thereby impinging on the blades at an angle different from the designed inlet angle, should orientation of the tube to direct the air in the preferred angle cause undue difficulty. When the air is directed at an angle which is different from the design inlet angle, it will be appreciated that the full kinetic energy of the air cannot be utilized but starting of the engine can, nevertheless, be effected in this manner.

If required, a number of tubes 34 may be provided for starting a large engine, these tubes being disposed at angularly spaced apart positions around the engine.

We claim:
1. In a gas turbine engine having a flow duct in which are mounted, in flow series, compressor means, compressor outlet guide vanes, combustion equipment, nozzle guide vanes and at least one row of turbine blades, said engine being provided with the improvement of a starting system comprising: a tube which is connected to a source of compressed air disposed outside a casing of said engine, said tube having a first portion comprising a plurality of ducts passing through the outlet guide vanes of the compressor means of the engine, a second portion which is radially inwardly of the combustion equipment of the engine and is substantially axially directed, and a third portion which is directed radially outwardly towards said nozzle guide vanes, said third portion further including an outlet end which terminates at the radially inner ends of the nozzle guide vanes of the turbine of said engine, and without protrusion into said flow duct, for directing compressed air with a radially outward component of velocity onto the radially outermost sections of the row of turbine blades following said nozzle guides vanes to start the engine.

2. An engine as claimed in claim 1 wherein said tube is supported radially inwardly of its outlet end, said third portion being defined between the outlet end of the tube and the support, said third portion being split into two parts with a gap therebetween to accommodate thermal expansion therein, said third portion being disposed in a sealed chamber to prevent air escaping from the tube through said gap.

References Cited
UNITED STATES PATENTS

| | | | |
|---|---|---|---|
| 2,704,645 | 3/1955 | Colvin | 60—39.14 |
| 3,085,396 | 4/1963 | Kent et al. | 60—39.14 |
| 2,749,023 | 6/1956 | Lewis | 60—39.14 X |
| 2,929,206 | 3/1960 | Davenport | 60—39.14 |
| 3,009,320 | 11/1961 | Paiement | 60—39.14 |
| 3,310,936 | 3/1967 | Stewart et al. | 60—39.14 |

JULIUS E. WEST, *Primary Examiner*